United States Patent
Ogawa (10) Patent No.: US 6,499,432 B2
(45) Date of Patent: *Dec. 31, 2002

(54) CLEANER FOR INSIDE OF WATER TANK

(75) Inventor: Soichi Ogawa, Tokyo (JP)

(73) Assignee: Suiken Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,762

(22) Filed: Oct. 14, 1999

(65) Prior Publication Data

US 2002/0046711 A1 Apr. 25, 2002

(30) Foreign Application Priority Data

Jan. 20, 1999 (JP) .......................................... 11-012172

(51) Int. Cl.⁷ .............................................. A01K 63/04
(52) U.S. Cl. ...................................................... 119/264
(58) Field of Search .............................. 119/264, 227, 119/232; D23/209, 210; 210/169, 416–2

(56) References Cited

U.S. PATENT DOCUMENTS

| | | | |
|---|---|---|---|
| 3,734,853 A | 5/1973 | Horvath | 210/169 |
| 4,236,488 A * | 12/1980 | Olds et al. | 119/5 |
| 4,957,623 A * | 9/1990 | Henzlik | 210/169 |
| 5,484,525 A * | 1/1996 | Mowka, Jr. | 210/169 |
| 5,695,654 A * | 12/1997 | Schultz | 210/780 |
| 5,779,884 A * | 7/1998 | Raymo | 210/97 |

FOREIGN PATENT DOCUMENTS

| | | | | |
|---|---|---|---|---|
| EP | 0 527 580 A | | 2/1993 | A01K/61/00 |
| JP | 404075547 A | * | 3/1992 | 119/232 |
| JP | 6-55087 | | 7/1994 | A01K/63/04 |

* cited by examiner

Primary Examiner—Charles T. Jordan
Assistant Examiner—Kimberly S. Smith
(74) Attorney, Agent, or Firm—Arent Fox Kinter Plotkin & Kahn, PLLC (57) ABSTRACT

A cleaner for the inside of a water tank is designed to draw up water stored within the water tank for aquarium fishes such as goldfishes, tropical fishes and the like to discharge the water to the outside. In this cleaner, a draw-up pipe is comprised of a body portion, and a grip portion connected at an angle of 90° or more to the body portion. A first one-way valve and a second one-way valve are mounted within the draw-up pipe. Thus, the cleaner has a good manipulatability, so that air stored in the cleaner can be reliably discharged, and the discharging of water can be carried out reliably.

3 Claims, 7 Drawing Sheets

CLEANER FOR INSIDE OF WATER TANK

BACKGROUND OF THE INVENTION

1. Field of the Invention

The present invention relates to an improvement of a cleaner for the inside of a water tank, which is designed so that water stored within the water tank used for breeding or rearing and bringing up aquarium fishes such as goldfishes, tropical fishes, saltwater fishes and the like, particularly, dirty water stored in the bottom of the water tank, can be drawn up and discharged to the outside of the water tank.

2. Description of the Related Art

To breed or rear and bring up aquarium fishes such as goldfishes, tropical fishes and the like within a water tank, in general, a purifying means is provided which comprises an internal-type or external-type filter device placed in the water tank and including an air pump or an underwater pump, so that the water stored in the water tank is forcibly circulated into the filter device by driving the pump. Water having a satisfactory quality required for breeding or rearing and bringing up fishes cannot be obtained by use of only such purifying means. For this reason, it is conventionally necessary to periodically renew the water within the water tank. There is a cleaner for such renewal of the water, which is known, for example, from Japanese Patent Publication No.6-55087.

Such cleaner is designed to draw up the water within the water tank through a draw-up pipe to the outside by utilizing a siphonage, and is comprised of the hard draw-up pipe and a flexible water conduit pipe which is withdrawably connected to a base end of the draw-up pipe. The draw-up pipe includes a straight body portion having a tip end opened, and a grip portion integrally connected at substantially right angles to a base end of the body portion. Further, a single one-way valve is provided within the draw-up pipe to permit flowing of the water from the front end to the base end of the draw-up pipe. Such cleaner is widespread, because it has an advantage that dirty water within the water tank, particularly, a filth such as leftover and excrement sedimented in the bottom of the water tank can be drawn up and discharged efficiently along with the dirty water.

However, the following disadvantages have been found in the course of servicing of the above cleaner, and it has been made clear that there. is room for further improvement in the cleaner.

(1) The draw-up pipe of the cleaner is bent to form an angle of substantially 90° between the body portion and the grip portion. Therefore, during service of the cleaner, the grip portion may hit an edge of the water tank and as a result, it may sometimes be difficult to manipulate the cleaner.

(2) Depending on the service state of the cleaner, air may remain accumulated in that upper portion of a bent section between the body portion and the grip portion which is an uppermost portion of the draw-up pipe, and this may obstruct the smooth drawing-up of the water by the siphonage.

(3) The connected portion of the flexible water conduit pipe to the draw-up pipe may be deteriorated with the passage of time, resulting in an insufficient water-tight connection of the conduit pipe to the draw-up pipe, or in slipping-off of the conduit pipe from the draw-up pipe.

(4) If the angle of bending of the connected portion of the flexible water conduit pipe to the draw-up pipe is too large, a narrower area is formed to obstruct the flowing of the water. Therefore, to prevent the above disadvantages, it is required that the connected portion of the conduit pipe is formed so that it is prevented from being bent, e.g., is formed into a double-pipe construction, thereby bringing about an increase in cost.

SUMMARY OF THE INVENTION

Accordingly, it is an object of the present invention to provide a novel cleaner for the inside of a water tank, wherein all the above-described disadvantages have been solved.

To achieve the above object, according to a first aspect and feature of the present invention, there is provided a cleaner for the inside of a water tank, which is designed to draw up water stored in the water tank by the siphonage to discharge the water to the outside of the water tank, and which comprises a draw-up pipe comprised of a straight body portion, and a grip portion connected to the body portion at 90° or more in communication therebetween, a flexible water conduit pipe connected to a downstream end of the draw-up pipe, a first one-way valve mounted in an appropriate place within the draw-up pipe to permit flowing of water from the draw-up pipe only to the conduit pipe, and a second one-way valve mounted within the draw-up pipe at a location downstream of the first one-way valve to permit flowing of water from the draw-up pipe only to the conduit pipe. p With the above arrangement, the draw-up pipe is less likely to hit an edge of the water tank and hence, it is easy to manipulate the cleaner within the water tank. Moreover, even if the draw-up pipe is in any drawing-up attitude within the water tank, air resident within the draw-up pipe, particularly within an upper portion of the draw-up pipe can be reliably discharged to the outside along with water, and the water discharging efficiency can be enhanced.

According to a second aspect and feature of the present invention, in addition to the first feature, a joint pipe attached to the water conduit pipe is connected to a downstream end of the draw-up pipe, and a hard outer pipe is fitted over and covers an outer periphery of a connection between the drawn-up pipe and the joint pipe, so as to prevent the slip-off of the water conduit pipe by the outer pipe, and to prevent the water conduit pipe from being folded to such an extent as obstructing the flowing of water therein.

With the above arrangement, it is possible to ensure the connection of the draw-up pipe to the water conduit pipe, and to prevent the extreme folding of the flexible water conduit pipe, so that water always flows smoothly within the water conduit pipe. Thus, it is possible to enhance the water discharging efficiency.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 show a first embodiment of the present invention, wherein

DESCRIPTION OF THE PREFERRED EMBODIMENTS

The present invention will now be described by way of embodiments shown in the accompanying drawings.

A first embodiment of the present invention will be first described with reference to FIGS. 1 to 7.

Referring to FIGS. 1 to 5, a draw-up pipe P constituting a main portion of a cleaner is formed of a transparent synthetic resin member, and comprises a cylindrical body portion 1 which is straight with its tip end opened, and which is formed at such a length reaching an internal bottom of a water tank T from the outside of the water tank T, and a grip portion 2 which is connected in communication to a base end, i.e., downstream end of the body portion 1 with an angle of about 105°. Each of the body portion 1 and the grip portion 2 is formed of a transparent hard synthetic resin pipe. The grip portion 2 is comprised of an elbow pipe $2_1$ and a straight pipe $2_2$ which are withdrawably connected in a water-tight manner to each other. In the draw-up pipe P, the connection of the body portion 1 to the grip portion 2 at an angle of larger than 90°, i.e., about 105° ensures that the grip portion 2 is difficult to hit against an edge of the water tank T during using of the cleaner, as described hereinafter, leading to an enhanced manipulatability of the cleaner.

Figure 1:
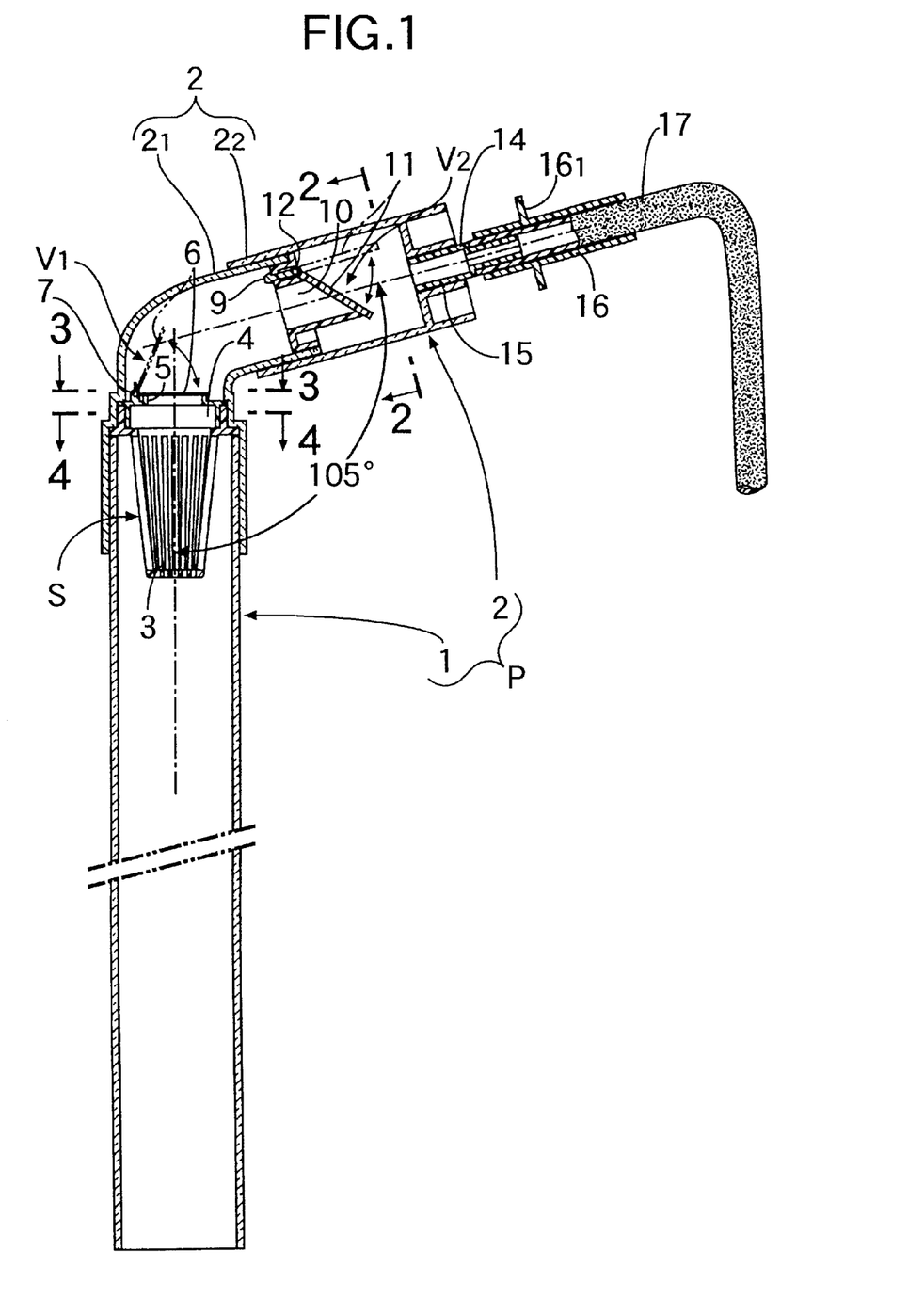
FIG. 1 is a vertical sectional side view of a cleaner for the inside of a water tank.
Figure 2:
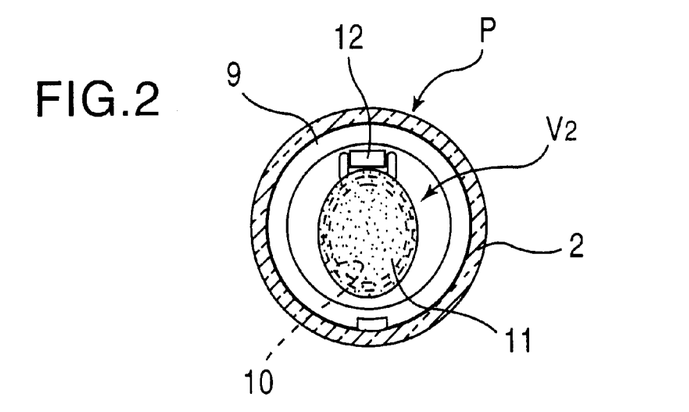
FIG. 2 is a sectional view taken along a line 2—2 in FIG. 1.
Figure 3:
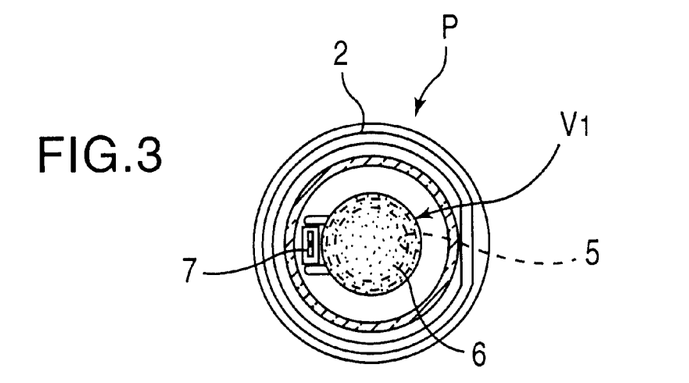
FIG. 3 is a sectional view taken along a line 3—3 in FIG. 1.
Figure 4:
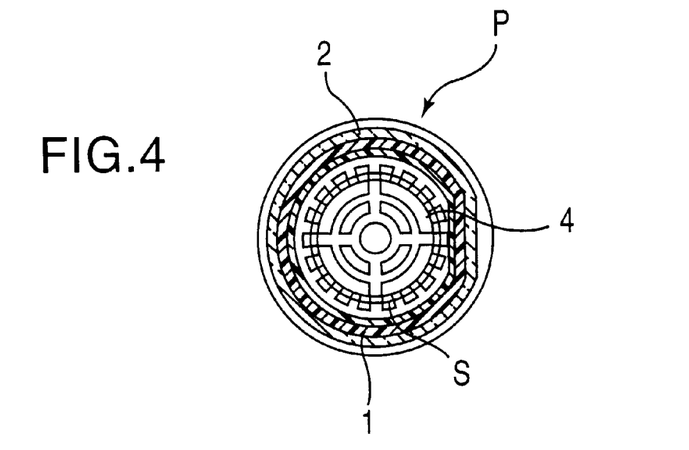
FIG. 4 is a sectional view taken along a line 4—4 in FIG. 1.

A tubular, truncated conical strainer S having a large number of slits 3 is mounted at the base end of the draw-up pipe P, i.e., at the connection of the body portion 1 and the grip portion 2. The strainer S is permeable to dirty water containing a fine filth such as leftover and excrement, but impervious to a coarse filth such as a dead leaf, a pebble and the like. A first one-way valve $V_1$ is mounted at a rear end, i.e., at an outlet 4 of the strainer S. The first one-way valve $V_1$ is comprised of a valve bore 5 which opens into a rear end face of the strainer S, and a valve body 6 which is connected by a hinge 7 to one side of the valve bore 5 for opening and closing the valve bore 5. The first one-way valve $V_1$ acts to permit flowing of water drawn up in the draw-up pipe P and passed through the strainer S, but to inhibit the back flow of the water.

A second one-way valve $V_2$ is mounted in a downstream end portion of the draw-up pipe P, at a location downstream of the first one-way valve $V_1$, i.e., in an intermediate portion of the grip portion 2. The second one-way valve $V_2$ is comprised of a valve seat member 9 fixed within the grip portion 2 and having a valve bore 10 opening therein, and a valve body 11 connected by a hinge 12 to the valve seat member 9 for opening and closing the valve bore 10. The valve bore 10 opening in the valve seat member 9 is formed into an elliptic shape by cutting a cylinder vertically obliquely. The valve body 11 seated in the valve bore 10 for opening and closing movements is also formed into an elliptic shape and connected by a hinge 12 to an upper portion of the valve seat member 9 (during servicing of the cleaner), and the opening and closing angle for the valve body 11 is set at about 45°, so that the opening and closing of the second one-way valve $V_2$ are smoothly conducted by the pressure of the water flowing in the draw-up pipe P.

A connecting pipe 15 having a diameter smaller than that of the grip portion 2 is integrally formed within a downstream end of the grip portion 2, and a joint pipe 14 attached to an upstream end of a water conduit pipe 17 is connected to the connecting pipe 15. The water conduit pipe 17 is formed of a flexible transparent pipe such as polyvinyl chloride pipe and the like. An outer pipe 16 formed of a hard synthetic resin member is fitted over a connection between the joint pipe 14 and the conduit pipe 17 to cover it. In this case, the outer pipe 16 is slidably fitted in advance over the conduit pipe 17, as shown by a dashed line in FIG. 5, and then slid to an outer periphery of the connection between the joint pipe 14 and the upstream end of the conduit pipe 17, whereby the outer pipe 16 is fitted over the connection to cover the connection.

Figure 5:
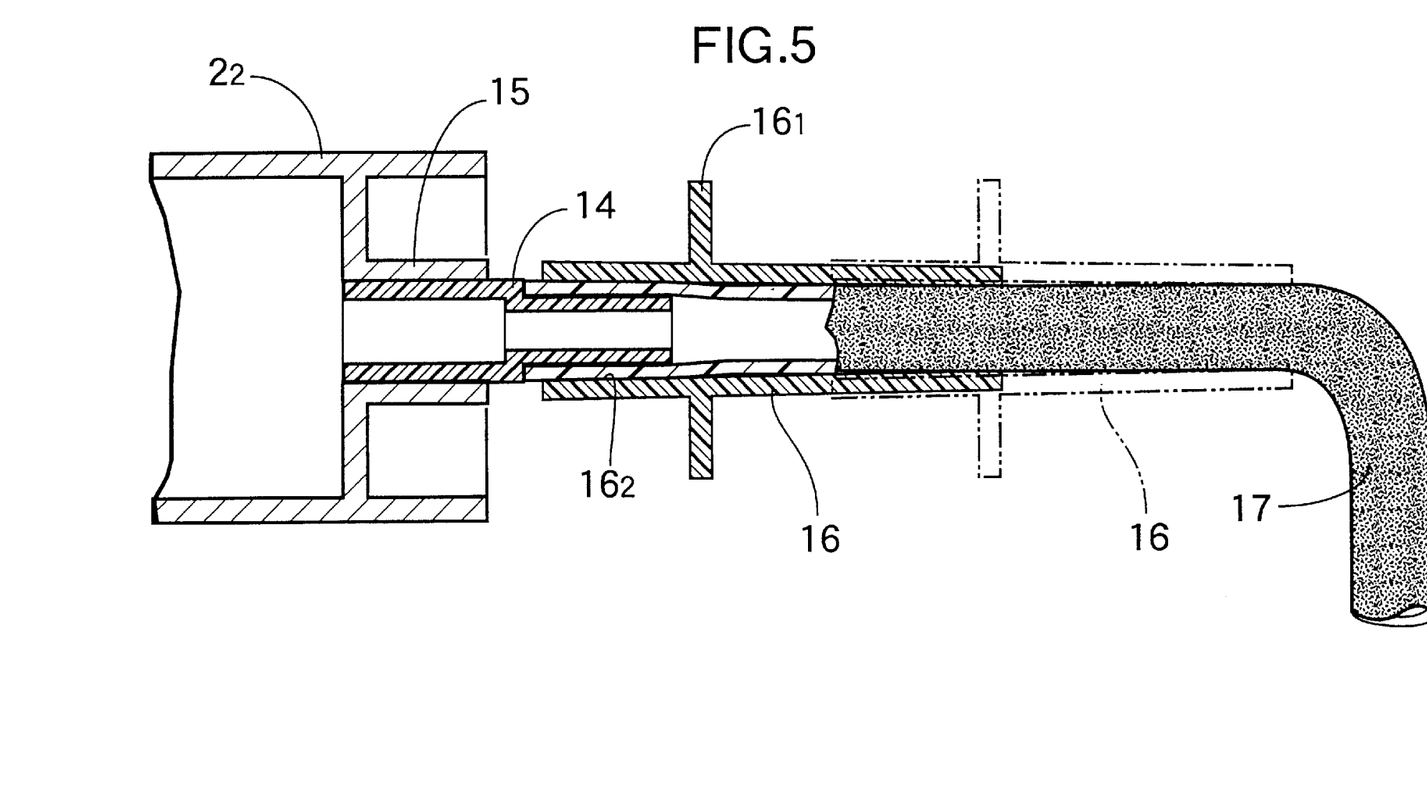
FIG. 5 is an enlarged view of a portion of the cleaner shown in FIG. 1.

The outer pipe 16 as clearly shown in FIG. 5, has an inner peripheral surface of an end thereof, i.e., at a connection thereof to the joint pipe 14, which is formed into an outward tapered surface $16_2$. Thus, the outer pipe 16 can be tightly fitted over the outer periphery of the connection between the joint pipe 4 and the conduit pipe 17 by a wedge effect of the tapered surface $16_2$ to prevent the withdrawal of the conduit pipe 17. The outer pipe 16 also has a flange piece $16_1$ integrally formed around the outer periphery of an intermediate portion thereof of a pipe material as relatively long as a user can grasp it, so that it is easy to grasp the outer pipe 16 by virtue of the flange piece $16_1$. The conduit pipe 17 is formed at such a length that when the tip end of the draw-up pipe P is placed to face the bottom of the water tank T, the downstream end of the conduit pipe 17 reaches below the water surface in the water tank T (i.e., at such a length that the siphonage of the cleaner is obtained, which will be described hereinafter).

A procedure for drawing up dirty water within the water tank T, particularly in the bottom of the water tank T to discharge the dirty water will be described below with reference to FIGS. 6 and 7.

Figure 7A:
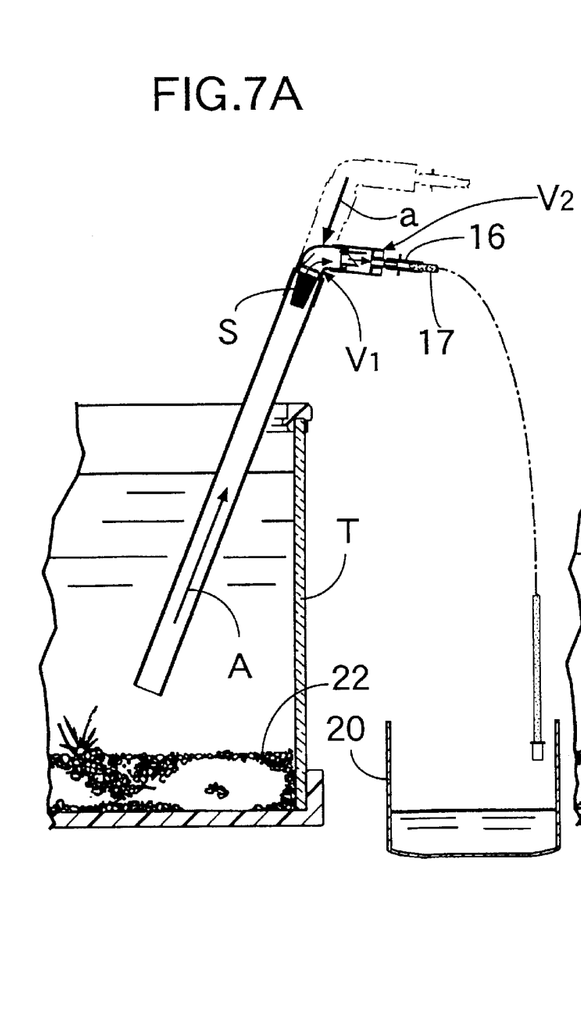
FIGS. 7A, 7B and 7C are views for illustrating an operation of discharging water within the water tank.

(1) First, as shown in FIG. 7A, the opened free end of the conduit pipe 17 is placed to face the inside of a recovering tank 20 such as a bucket, and half of the tip end of the draw-up pipe P is immersed into the stored water in the water tank T. as shown by an arrow from a lengthwise direction of the draw-up pipe by grasping the grip portion 2. At this time, a portion of air within the draw-up pipe P flows into the conduit pipe 17 due to the water within the water tank T entering into the draw-up pipe P to the middle (the water surface) thereof, as shown by an arrow A in FIG. 7A. Therefore, both of the first and second one-way valves $V_1$ and $V_2$ are opened, thereby permitting the air to be released to the outside.

Figures 7B, 7C:
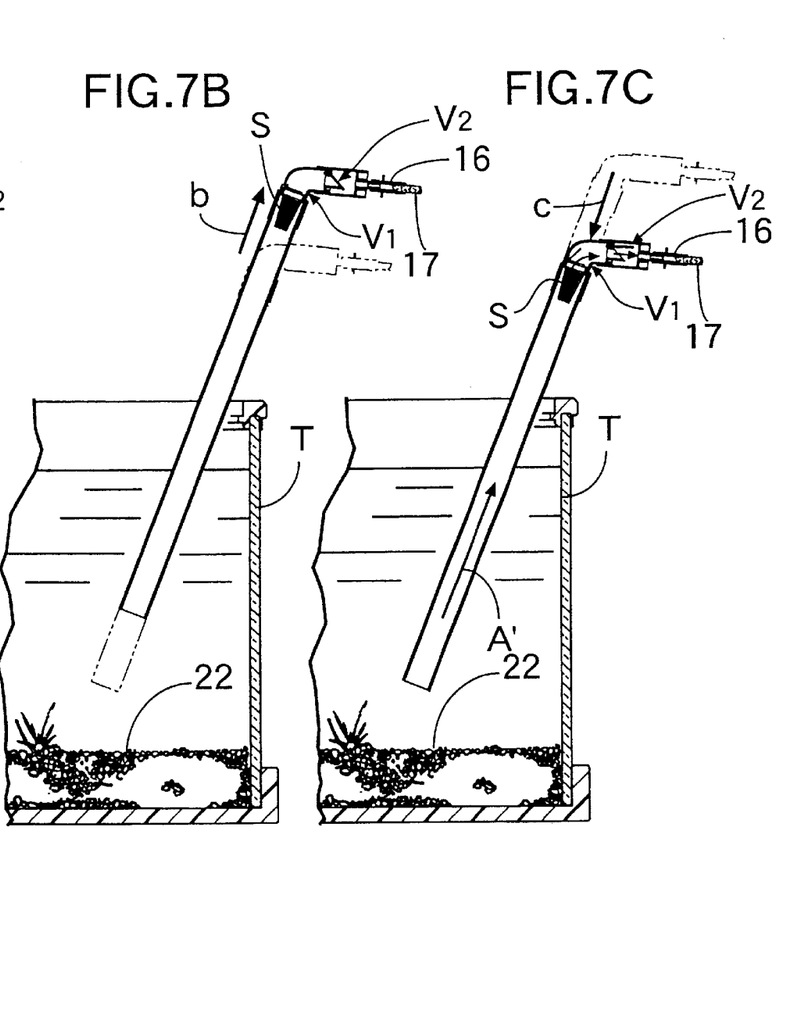

(2) As shown in FIG. 7B, the draw-up pipe P is then pulled quickly upwards in the lengthwise direction, as shown by an arrow b, from a position indicated by a two-dot dashed line to a position indicated by a solid line. By this pulling movement, both of the first and second one-way valves $V_1$ and $V_2$ are closed, whereby the inside of the draw-up pipe P tends to be under a negative pressure and thus, the water within the draw-up pipe P is lifted from the water surface within the water tank T.

(3) When the draw-up pipe P is pushed quickly downwards from the state shown in FIG. 7B, as shown by an arrow c in FIG. 7C, whereby the draw-up pipe P is lowered from a position indicated by a dashed line to a position indicated by a solid line, the water within the draw-up pipe P starts to flow in a direction indicated by an arrow A', and flows out of the draw-up pipe P into the conduit pipe 17 through the first and second one-way valves $V_1$ and $V_2$. By repeating the operations described with reference to FIGS. 7B and 7C a few times, the air within the draw-up pipe P and the conduit pipe 17 is discharged, and water flowing through the draw-up pipe P and the conduit pipe 17 flows continuously by the siphonage, and thus, water within the water tank T is discharged.

In the movement of the water discharged by the siphonage, since the second one-way valve $V_2$ is provided in the downstream side of the first one-way valve $V_1$ within the draw-up pipe P, the air within the draw-up pipe P is discharged promptly and reliably to the outside along with water without remaining resident within the draw-up pipe, particularly, an upper portion of the draw-up pipe, as a result of opening of the first and second one-way valves $V_1$ and $V_2$ caused by the flowing of the water. In this manner, the discharge of the water by the siphonage is carried out.

Figure 6:
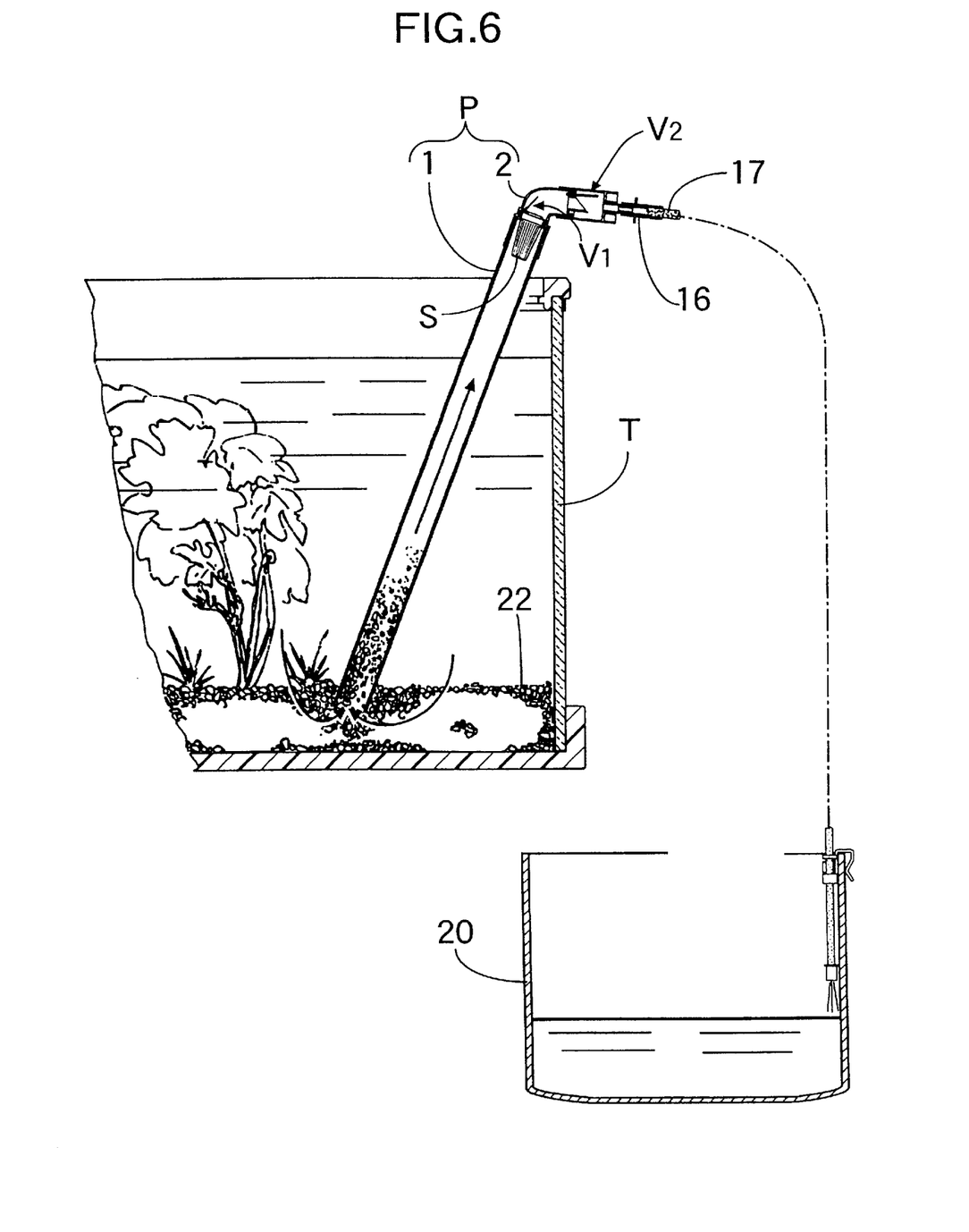
FIG. 6 is a vertical sectional side view of the cleaner which is in a service state in the water tank.

When the opened free end of the draw-up pipe P is placed into gravel 22 on the bottom of the water tank T, as shown in FIG. 6, after realization of the operation of the discharging of the water by the siphonage, the dirty water containing a fine filth such as leftover and excrement can be drawn up and discharged through the draw-up pipe P and the conduit pipe 17. During this time, a relatively coarse filth such as dead leaf contained in the dirty water is separated by the strainer S. In the operation of the drawing-up and discharging of the dirty water, the dirty water from which the coarse filth such as dead leaf has been separated off by the strainer S is passed through the first and second one-way valves $V_1$ and $V_2$ and hence, the first and second one-way valves $V_1$ and $V_2$ cannot be clogged with the filth.

In the above-described water discharging operation, the conduit pipe 17 cannot be slipped off from the joint pipe 14, because the outer pipe 16 is fitted over the outer periphery of the connection between the joint pipe 14 integral with the draw-up pipe P and the conduit pipe 17. Even if the connection of the conduit pipe 17 to the joint pipe 14 is loosened due to the deterioration with the passage of time or the like, the water tightness of the connection can be always maintained, and the water discharging operation can be carried out without hindrance. In addition, during the operation of the draw-up pipe P, the connection of the flexible conduit pipe 17 to the draw-up pipe P cannot be folded extremely to cause squeezing of the conduit pipe 17, and the flowing of the water cannot be obstructed.

Figure 8:
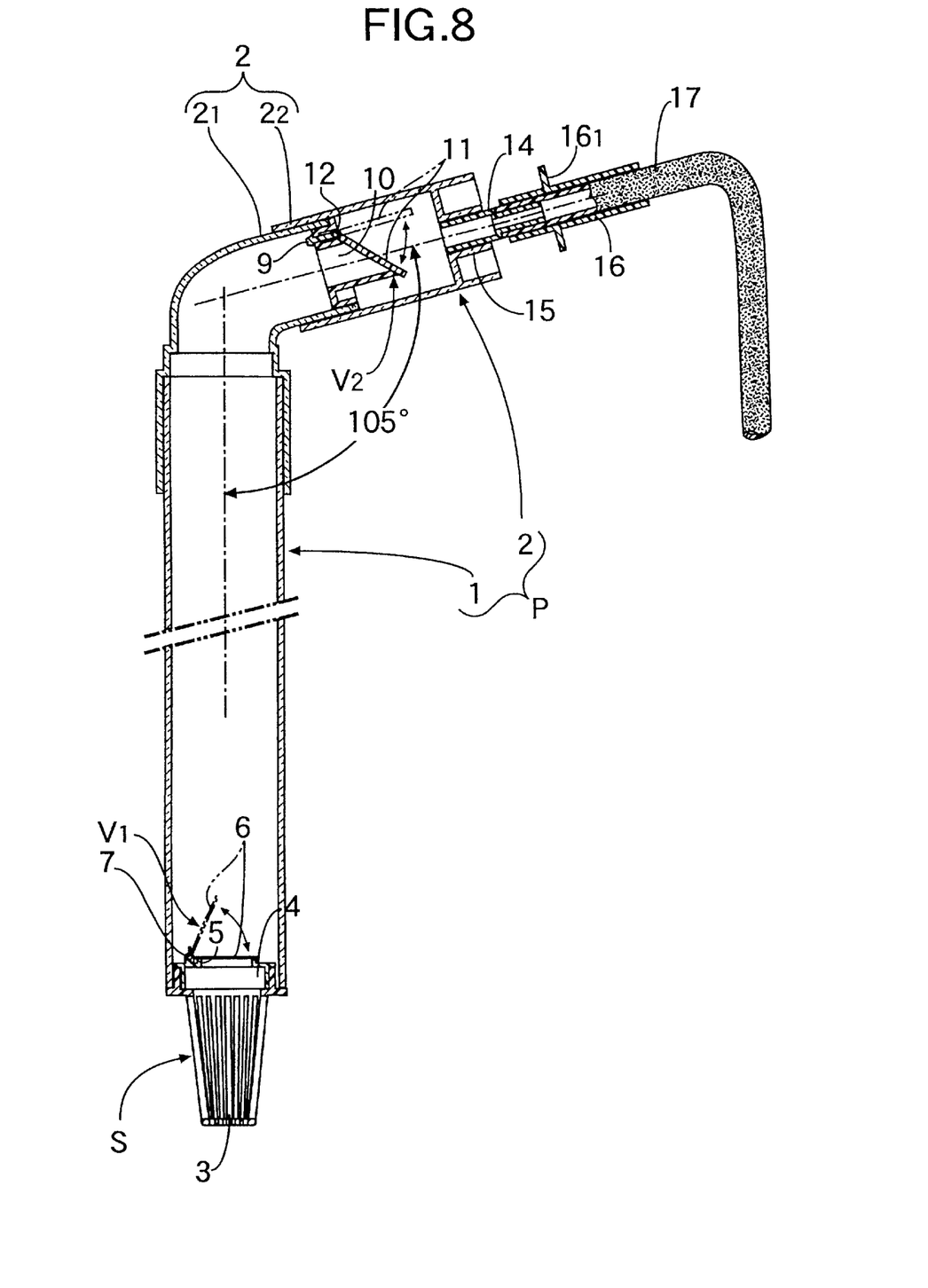
FIG. 8 is a vertical sectional side view of a cleaner for the inside of a water tank.
Figure 9:
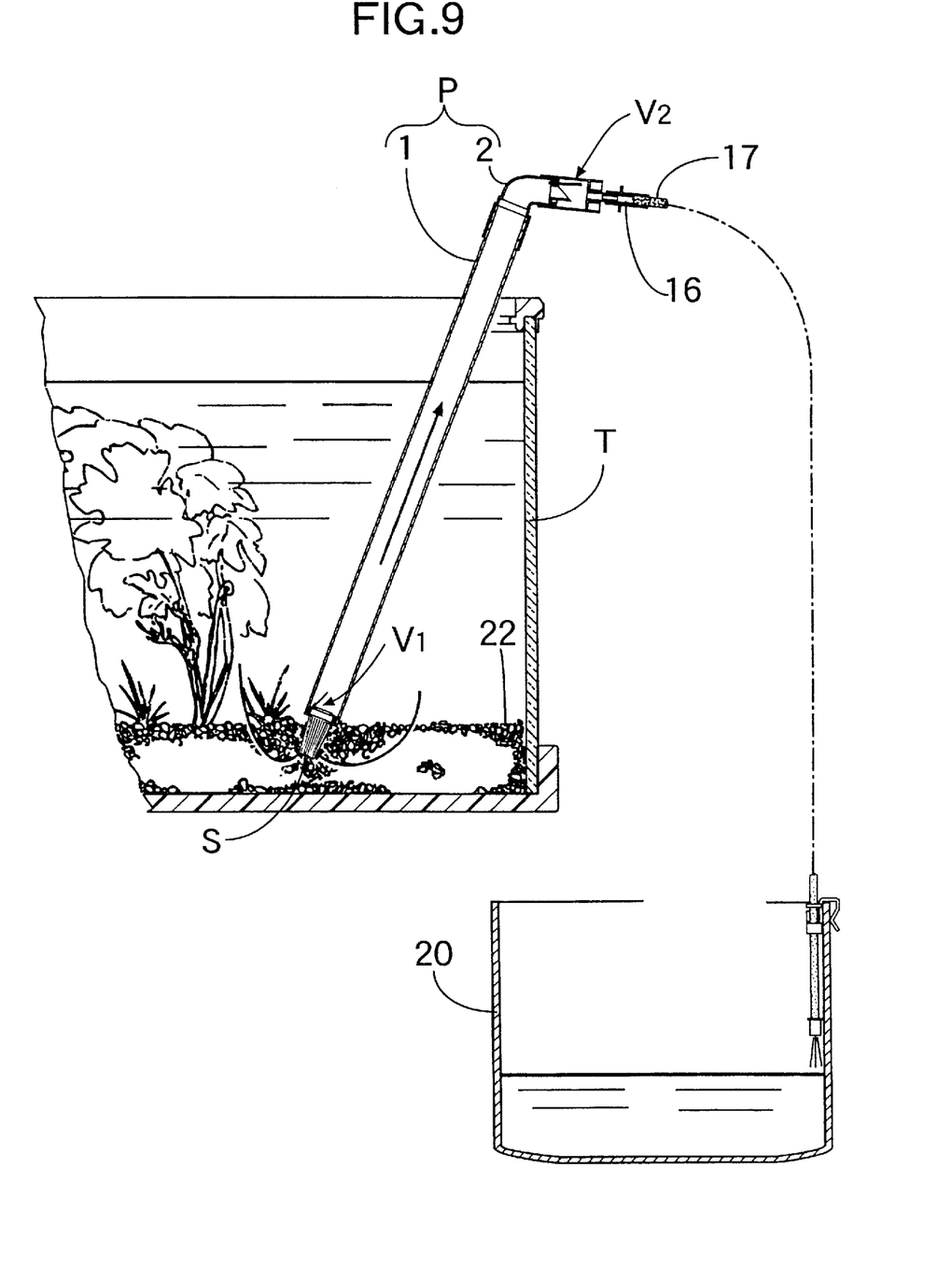
FIG. 9 is a vertical sectional side view of the cleaner which is in a service state in the water tank.

A second embodiment of a cleaner according to the present invention will now be described with reference to FIGS. 8 and 9, wherein members or portions corresponding to those in the first embodiment are designated by like reference characters.

In this embodiment, a strainer S including a first one-way valve $V_1$ is detachably mounted at the opened free end of the draw-up pipe P and exposed to the outside from the draw-up pipe P.

Even in the second embodiment, if the strainer S is placed into a gravel 22 on the bottom of the water tank T in the same manner as in the first embodiment after realization of the siphonage, a relatively coarse filth such as dead leaf is separated and cannot be drawn up into the draw-up pipe P. Even in the case of the second embodiment, air stored in the upper portion of the draw-up pipe P is discharged to the outside along with the water flowing in the draw-up pipe P. In this manner, the operation of discharging of the water by the siphonage is carried out smoothly and reliably.

Although the present invention has been described in detail, it will be understood that the present invention is not limited to the above-described embodiments, and various modifications in design may be made without departing from the spirit and scope of the invention defined in claims. For example, the angle formed by the body portion and grip portion of the draw-up pipe P is 105° in the embodiments, but may be set at a value of 90° or more which ensures that the cleaner is manipulated easily.

What is claimed is:

1. A cleaner for the inside of a water tank, which is designed to draw up water stored in the water tank by the siphonage to discharge the water to the outside of the water tank, said cleaner comprising a draw-up pipe comprised of a straight body member, and a straight grip member connected to said straight body member, via a bent member having an angle of more than 90°, a flexible water conduit pipe connected to a downstream end of said draw-up pipe, a first one-way valve mounted within said draw-up pipe at a location upstream at said bent member to permit flowing of water from said draw-up pipe only to said conduit pipe, and a second one-way valve mounted within said draw-up pipe at a location downstream of said bent member to permit flowing of water from said draw-up pipe only to said conduit pipe.

2. A cleaner for the inside of a water tank according to claim 1, further including a joint pipe attached to said water conduit pipe, said joint pipe being connected to a downstream end of said draw-up pipe, and a hard outer pipe which is fitted over and covers an outer periphery of a connection between said draw-up pipe and said joint pipe, so as to prevent the slip-off of said water conduit pipe by said outer pipe, and to prevent said water conduit pipe from being folded to such an extent as obstructing the flowing of water therein.

3. A cleaner for the inside of a water tank according to claim 1, wherein said grip portion is connected to said body portion at 105°.

* * * * *